United States Patent
Natsuda et al.

(10) Patent No.: US 9,919,371 B2
(45) Date of Patent: Mar. 20, 2018

(54) GEAR MACHINING APPARATUS (71) Applicant: JTEKT CORPORATION, Osaka-shi (JP)

(72) Inventors: Kazuki Natsuda, Kitanagoya (JP); Hisashi Otani, Anjo (JP); Hiroyuki Nakano, Tokai (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/202,957

(22) Filed: Jul. 6, 2016

(65) Prior Publication Data
US 2017/0008103 A1  Jan. 12, 2017

(30) Foreign Application Priority Data
Jul. 9, 2015  (JP) .................. 2015-137636

(51) Int. Cl.
*B23F 5/16* (2006.01)
*B23F 5/20* (2006.01)
*B23F 21/12* (2006.01)

(52) U.S. Cl.
CPC .............. *B23F 5/202* (2013.01); *B23F 5/205* (2013.01); *B23F 21/122* (2013.01); *B23F 5/163* (2013.01); *Y10T 409/105088* (2015.01); *Y10T 409/105247* (2015.01); *Y10T 409/105565* (2015.01);
(Continued)

(58) Field of Classification Search
CPC .. B23F 5/202; B23F 5/163; B23F 5/12; B23F 5/20; B23F 21/122; B23F 21/126; B23F 21/128; B23F 21/10; B23F 21/16; B23F 19/06; Y10T 409/105088; Y10T 409/105247; Y10T 409/105565; Y10T 409/105724; Y10T 409/107632; Y10T 407/1735
See application file for complete search history.

(56) References Cited

U.S. PATENT DOCUMENTS

| 2,278,737 | A | * | 4/1942 | Praeg | ................. | B23F 21/28 |
| | | | | | | 407/27 |
| 2,329,284 | A | * | 9/1943 | Mentley | ............... | B23F 21/288 |
| | | | | | | 407/27 |

(Continued)

FOREIGN PATENT DOCUMENTS

| DE | 1083621 | B | * | 6/1960 | ............. | B23F 21/16 |
| DE | 2654177 | A1 | * | 6/1978 | ............. | B23F 5/163 |

(Continued)

*Primary Examiner* — Sunil K Singh
*Assistant Examiner* — Ryan Rufo
(74) *Attorney, Agent, or Firm* — Oblon, McClelland, Maier & Neustadt, L.L.P.

(57) ABSTRACT

A gear machining apparatus includes a machining tool having a plurality of protruding tool edges on an outer periphery of the machining tool, and driving apparatuses that form a tooth on a work piece by rotating the machining tool around a central axis thereof, rotating the work piece W around a central axis thereof, and moving the machining tool relative to the work piece. Radial outer faces of the protruding tool edges form multiple steps that are parallel to the central axis of the machining tool such that the diameter of the machining tool increases in a stepwise manner from a tool leading end toward a tool base end of the machining tool.

6 Claims, 7 Drawing Sheets

(52) U.S. Cl.
CPC ............... *Y10T 409/105724* (2015.01); *Y10T 409/107632* (2015.01)

(56) References Cited

U.S. PATENT DOCUMENTS

| | | | | |
|---|---|---|---|---|
| 2,336,760 A * | 12/1943 | Sykes | ............... | B23F 5/166 409/35 |
| 2,598,327 A * | 5/1952 | Wildhaber | ............... | B23F 5/16 409/36 |
| 3,875,630 A * | 4/1975 | Taniguchi | ............... | B23F 21/28 407/27 |
| 3,931,754 A * | 1/1976 | Nishijima | ............... | B23F 5/163 407/28 |
| 5,651,644 A * | 7/1997 | Basili | ............... | B23F 21/284 407/27 |
| 2015/0043985 A1* | 2/2015 | Otani | ............... | B23F 21/00 409/56 |

FOREIGN PATENT DOCUMENTS

| | | | | |
|---|---|---|---|---|
| EP | 1 504 838 A1 | 2/2005 | | |
| EP | 2792442 A1 * | 10/2014 | ............... | B23F 5/163 |
| GB | 721841 A * | 1/1955 | ............... | B23F 21/16 |
| JP | 2005-66815 | 3/2005 | | |
| JP | 2012-45687 | 3/2012 | | |

* cited by examiner

GEAR MACHINING APPARATUS

INCORPORATION BY REFERENCE

The disclosure of Japanese Patent Application No. 2015-137636 filed on Jul. 9, 2015 including the specification, drawings and abstract, is incorporated herein by reference in its entirety.

BACKGROUND OF THE INVENTION

1. Field of the Invention

The invention relates to a gear machining apparatus.

2. Description of the Related Art

A machining method described in Japanese Patent Application Publication No. 2012-45687 (JP 2012-45687 A), for example, is an effective technique for creating internal teeth or external teeth on a work piece by cutting using a machine tool such as a machining center. The machining method involves synchronously rotating a machining tool that is rotatable around a central axis (tool axis) and a work piece that is rotatable around a central axis (work piece axis) inclined at a predetermined angle to the tool axis of the machining tool, and feeding the machining tool in the direction of the work piece axis of the work piece a plurality of times to cut the work piece so as to create teeth on the work piece.

The machining tool used in this machining method is provided with a plurality of protruding tool edges by which the work piece can be cut by a predetermined amount during one feeding operation in the direction of the work piece axis. The protruding tool edges are all formed to have a flat (stepless) radial outer face (edge face) and the same edge width. Since the same parts of the protruding tool edges come into contact with the work piece from roughing to finishing, the parts are significantly worn off and the tool is short-lived. The worn-off protruding tool edges may be re-polished. However, an envelope of the edge faces of the protruding tool edges is shaped like a conical surface, and thus, the re-polishing tends to reduce the accuracy of the protruding tool edges.

Japanese Patent Application Publication No. 2005-66815 (JP 2005-66815 A) describes a machining tool for a gear that is formed to have such an edge profile contour in a section perpendicular to the axis of tool edges that is determined using a predetermined method and that allows maintaining the accuracy of the tool edges even after the worn-off tool edges are re-polished.

For the machining tools in JP 2012-45687 A and JP 2005-66815, operations from roughing through finishing are sequentially performed. Consequently, a reduction in machining time is limited. The machining tool described in JP 2005-66815 A is a shaper machining tool and is not applicable to the method in which the machining tool and the work piece are synchronously rotated to create teeth by cutting as described in JP 2012-45687 A.

SUMMARY OF THE INVENTION

An object of the invention is to provide a gear machining apparatus that enables a reduction in machining time when a machining tool and a work piece are synchronously rotated to create gears by cutting and an increase in tool life.

According to an aspect of the invention, a gear machining apparatus includes a machining tool including a tool edge having a plurality of protruding tool edges on an outer periphery of the machining tool, and a driving apparatus that forms a tooth on a work piece by rotating the machining tool around a central axis thereof, rotating the work piece around a central axis thereof, and moving the machining tool relative to the work piece. The driving apparatus sets the central axis of the machining tool and the central axis of the work piece in a skew state, and drives the machining tool straight ahead in a direction of the central axis of the machining tool toward the work piece while synchronizing rotation of the work piece with rotation of the machining tool so as to allow the protruding tool edges to form a tooth on the work piece. Radial outer faces of the protruding tool edges form multiple steps that are parallel to the central axis of the machining tool such that a diameter of the machining tool increases in a stepwise manner from a tool leading end toward a tool base end of the machining tool.

The machining tool is driven straight ahead in the direction of the central axis of the machining tool toward the work piece so as to allow the protruding tool edges forming multiple steps to sequentially cut the work piece. Therefore, the work piece can be cut by a large amount without the need to feed the machining tool in the direction of the machining tool axis a plurality of times as in the case of conventional machining tools. This enables a reduction in machining time and restrains the tool from being worn off to increase the tool life.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A gear machining apparatus will be described with reference to FIG. 1 taking a five-axis machining center as an example. In other words, the gear machining apparatus 1 has, as driving axes, three linear axes (X axis, Y axis, and Z axis) that are orthogonal to one another and two axes of rotation (A axis and C axis).

Figure 1:
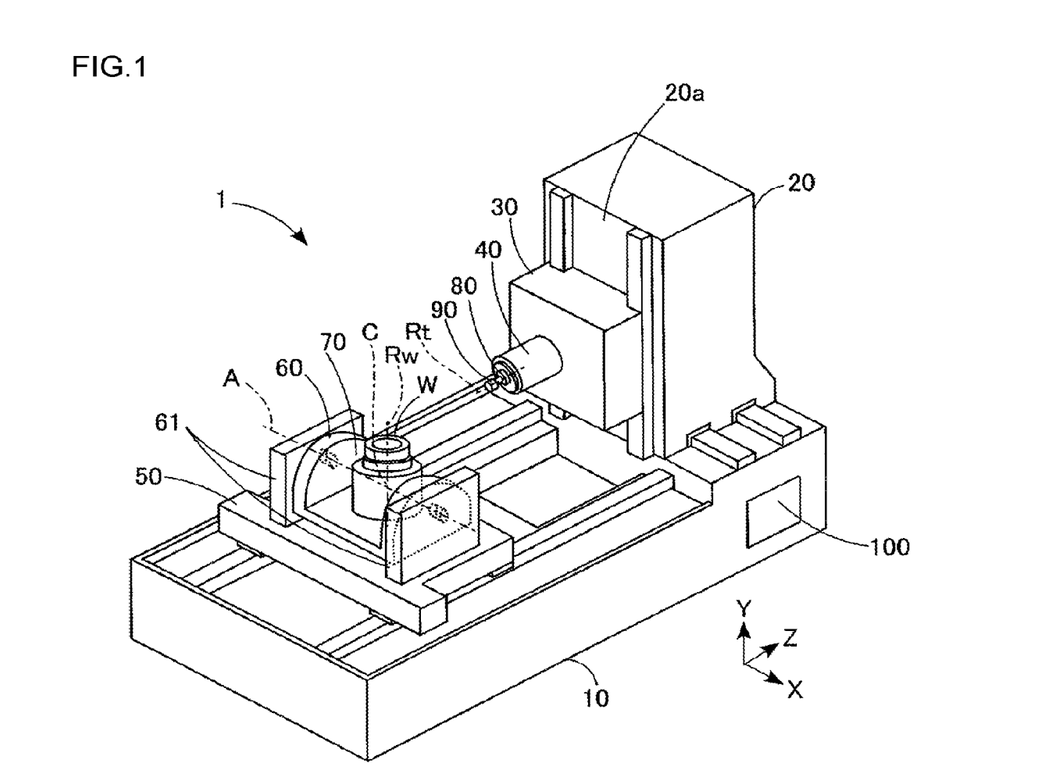
FIG. 1 is a perspective view depicting a general configuration of a gear machining apparatus according to an embodiment of the invention.

As depicted in FIG. 1, the gear machining apparatus 1 includes a bed 10, a column 20, a saddle 30, a rotating main spindle 40, a table 50, a tilt table 60, a turntable 70, and a control apparatus 100. Although not depicted in the drawing, a known automatic tool replacement apparatus is provided beside the bed 10.

The bed 10 is shaped generally like a rectangle and arranged on a floor. The column 20 is provided on an upper surface of the bed 10 so as to be movable in an X axis direction with respect to the bed 10. The saddle 30 is provided on a side surface (sliding surface) 20a of the column 20 that is parallel to the X axis such that the saddle 30 is movable in a Y axis direction with respect to the column 20.

The rotating main spindle 40 is provided so as to be rotatable with respect to the saddle 30 to support a machining tool 90. The machining tool 90 is held by the tool holder 80, fixed to a leading end of the rotating main spindle 40, and rotates in conjunction with rotation of the rotating main spindle 40. The machining tool 90 moves in the X axis direction and the Y axis direction with respect to the bed 10 in conjunction with movement of the column 20 and the saddle 30.

The table 50 is provided on the upper surface of the bed 10 so as to be movable in a Z axis direction with respect to the bed 10. A tilt table support portion 61 is provided on an upper surface of the table 50 to support the tilt table 60. The tilt table 60 is provided on the tilt table support portion 61 so as to be rotatable (swingable) around the A axis extending in the horizontal direction. The turntable 70 is provided on the tilt table 60 so as to be rotatable around the C axis, which is perpendicular to the A axis. A work piece W is attached to the turntable 70.

The control apparatus 100 serves as a driving apparatus to control movement of the column 20, the saddle 30, the rotating main spindle 40, the table 50, the tilt table 60, and the turntable 70. The control apparatus 100 moves the work piece W and the machining tool 90 in the X axis direction, the Y axis direction, and the Z axis direction and around the A axis and the C axis relative to each other to cut the work piece W.

Figure 2A:
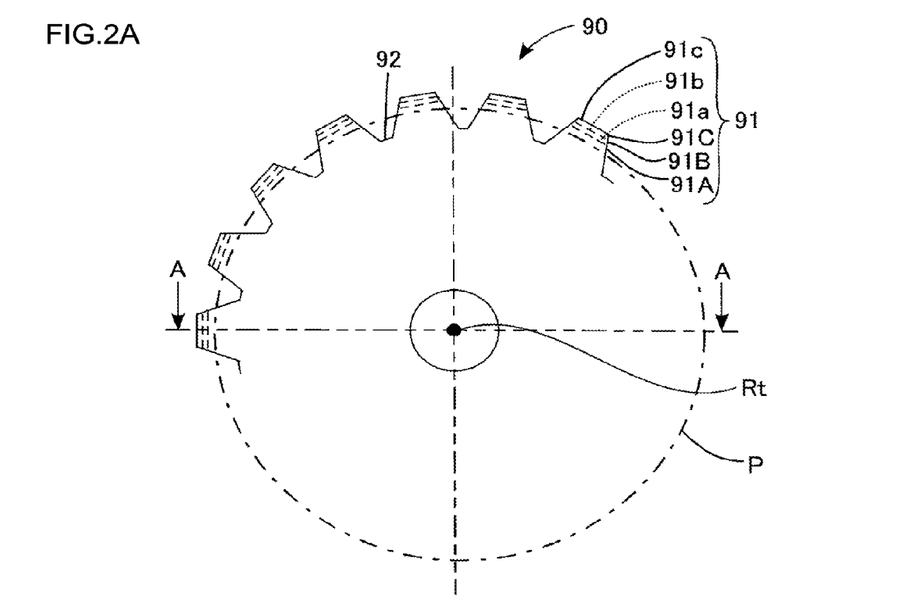
FIG. 2A is a schematic diagram of a machining tool used in the gear machining apparatus in FIG. 1 as viewed in a direction of a tool axis.
Figure 2B:
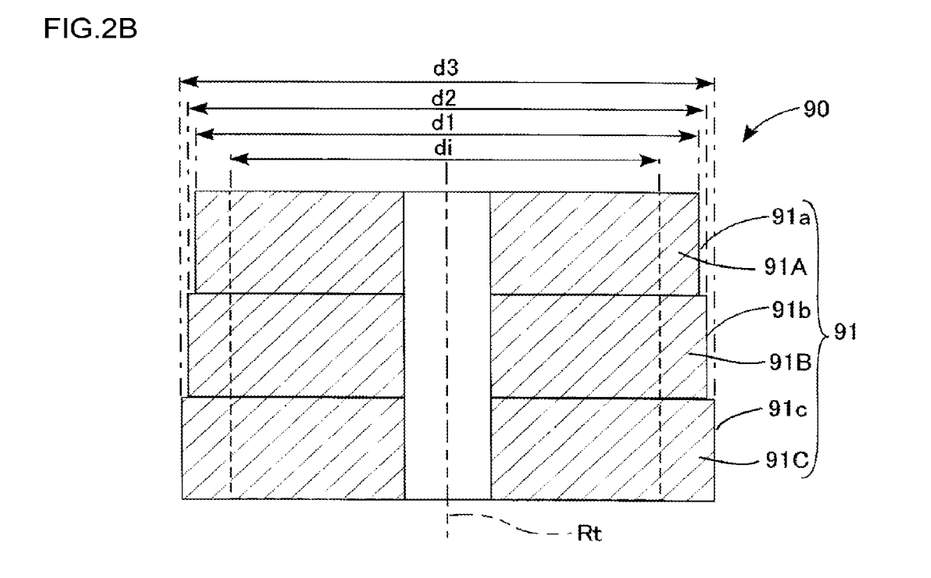
FIG. 2B is a sectional view of the machining tool in FIG. 2A as viewed in a direction perpendicular to the tool axis of the machining tool, taken along the line A-A in FIG. 1.

The above-described gear machining apparatus 1 feeds the machining tool 90 in the direction of a central axis of the work piece W (work piece axis Rw) to cut the work piece W so as to create teeth on the work piece W. The machining tool 90 used for the gear machining apparatus 1 is shaped like a cylinder and has a plurality of protruding tool edges 91 on an outer periphery of the machining tool 90, as depicted in FIGS. 2A and 2B. Each of the protruding tool edges 91 has a first protruding tool edge 91A, a second protruding tool edge 91B, and a third protruding tool edge 91C.

Radial outer surfaces (edge faces) 91a, 91b, 91c of the first, second, and third protruding tool edges 91A, 91B, 91C forms multiple steps (in the present example, three steps) that are parallel to a central axis of the machining tool 90 (tool axis Rt) such that the diameter of the machining tool 90 increases in a stepwise manner from a tool leading end toward a tool base end of the machining tool 90. The tool leading end of the machining tool 90 refers to a portion of the machining tool 90 on which the machining tool 90 and the work piece W come into contact with each other first during machining.

That is, the first edge face 91a at a tool leading end side is formed on the smallest outside diameter d1 that is constant in an extending direction of each of the protruding tool edges 91. The third edge face 91c at a tool base end side is formed on the largest outside diameter d3 that is constant in the extending direction of the protruding tool edge 91. The second edge face 91b positioned midway between the first edge face 91a and the third edge face 91c is formed on an outside diameter d2 that is intermediate between the outside diameter d1 and the outside diameter d3 on which the third edge face 91c is formed in size and that is constant in the extending direction of the protruding tool edge 91. Trough portions 92 between the adjacent protruding tool edges 91 in a circumferential direction are formed on the same outside diameter di.

Figure 3:
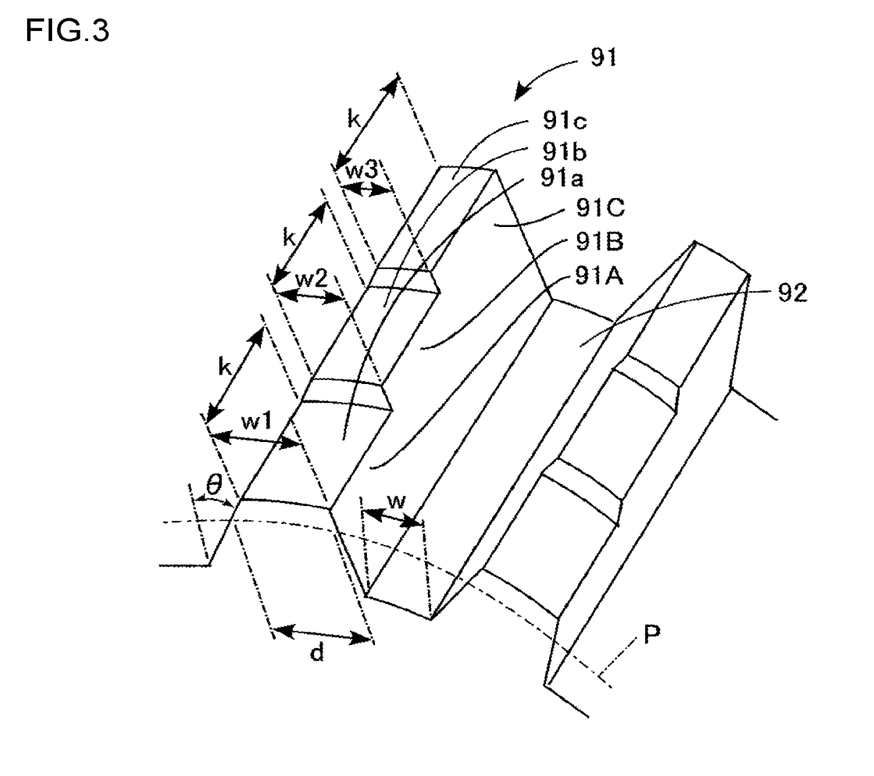
FIG. 3 is an enlarged perspective view of a first protruding tool edge, a second protruding tool edge, and a third protruding tool edge of the machining tool in FIG. 2A.

As depicted in FIG. 3, the first, second, and third edge faces 91a, 91b, 91c of the first, second, and third protruding tool edges 91A, 91B, 91C are formed to have the same length k in the direction of the tool axis Rt such that the first, second, and third edge faces 91a, 91b, 91c do not interfere with the work piece W during machining. Each of the first, second, and third edge faces 91a, 91b, 91c is formed to have a constant circumferential width in the extending direction of each protruding tool edge 91 (the direction from the tool leading end toward the tool base end) (circumferential widths w1, w2, w3 of the edge faces 91a, 91b, 91c are each constant over the length k). The circumferential widths decrease in a stepwise manner from the tool leading end toward the tool base end of the machining tool 90 (w1>w2>w3).

That is, the first edge face 91a is formed to have the largest circumferential width w1 that is constant in the extending direction of each protruding tool edge 91. The third edge face 91c is formed to have the smallest circumferential width w3 that is constant in the extending direction of the protruding tool edge 91. The second edge face 91b is formed to have the circumferential width w2 that is intermediate between the circumferential width w1 and the circumferential width w3 in size and that is constant in the extending direction of the protruding tool edge 91. The trough portions 92 between the adjacent protruding tool edges 91 in the circumferential direction are formed to have the same width w.

The first, second, and third protruding tool edges 91A, 91B, 91C are integrally formed, that is, formed by cutting one metal block. Consequently, the first, second, and third protruding tool edges 91A, 91B, 91C are accurately in phase with one another. The machining tool 90 is formed such that the first, second, and third protruding tool edges 91A, 91B, 91C have the same edge thickness d, the same pressure angle θ, the same module, and the same number of edges on a pitch circle P.

Consequently, the contour shape of an edge end face of the first protruding tool edge 91A is included in the contour shape of an edge end face of the second protruding tool edge 91B. The contour shape of the edge end face of the second protruding tool edge 91B is included in the contour shape of an edge end face of the third protruding tool edge 91C (see FIG. 2A). A part of the work piece W that is cut by the first protruding tool edge 91A is not cut by the second protruding tool edge 91B. The second protruding tool edge 91B cuts the work piece W using a portion of the second protruding tool edge 91B that protrudes in a radial direction with respect to the first protruding tool edge 91A. A part of the work piece W that is cut by the second protruding tool edge 91B is not cut by the third protruding tool edge 91C. The third protruding tool edge 91C cuts the work piece W using a portion of the third protruding tool edge 91C that protrudes in the radial direction with respect to the second protruding tool edge 91B.

Figure 4A:
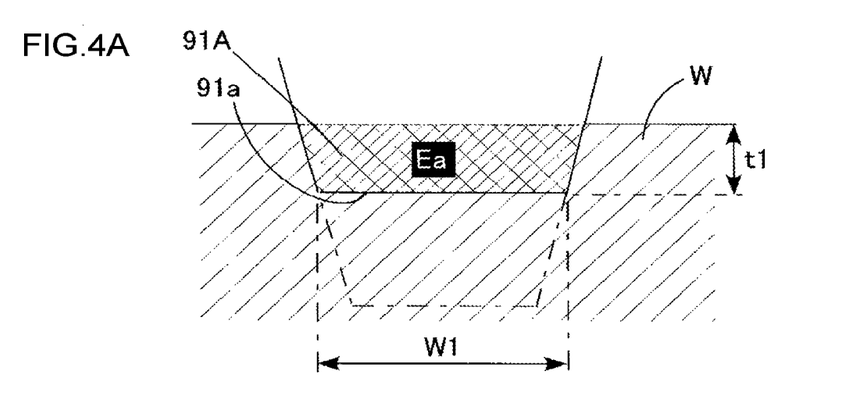
FIG. 4A is a partial sectional view of the machining tool in FIG. 2A as seen in the direction of the tool axis, illustrating the amount of cutting by which a work piece is cut by the first protruding tool edge of the machining tool.
Figure 4B:
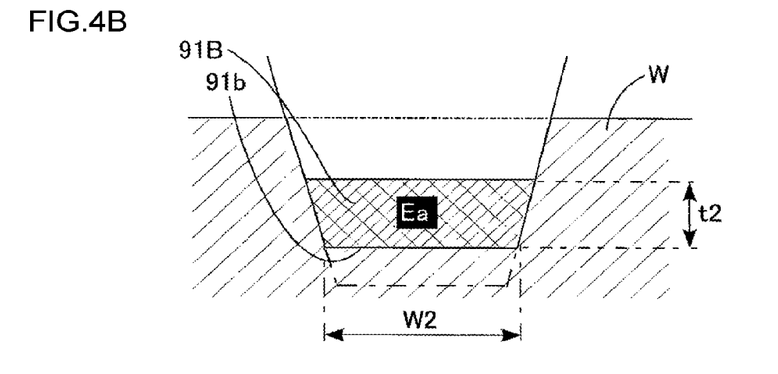
FIG. 4B is a partial sectional view of the machining tool in FIG. 2A as seen in the direction of the tool axis, illustrating the amount of cutting by which the work piece is cut by the second protruding tool edge of the machining tool.
Figure 4C:
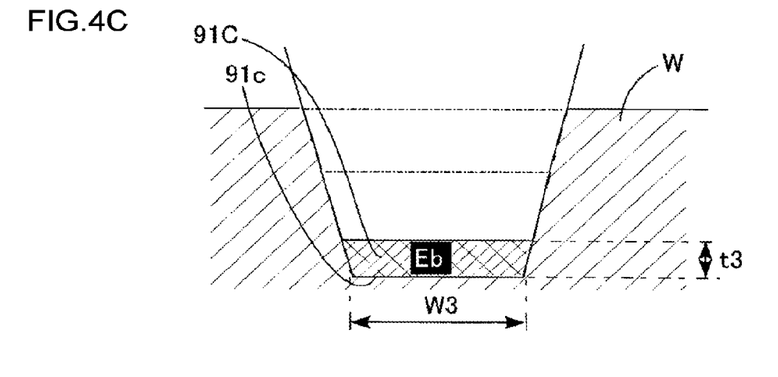
FIG. 4C is a partial sectional view of the machining tool in FIG. 2A as seen in the direction of the tool axis, illustrating the amount of cutting by which the work piece is cut by the third protruding tool edge of the machining tool.
Figure 5:
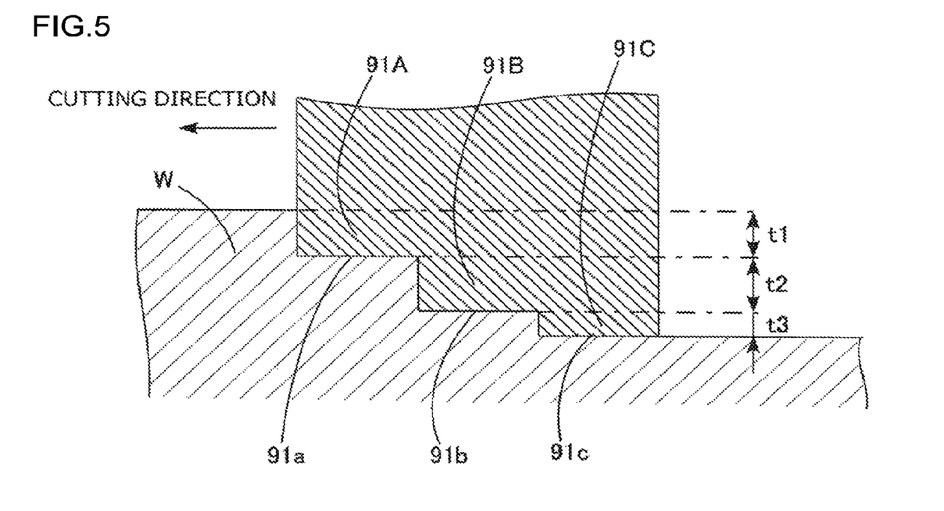
FIG. 5 is a sectional view as viewed in a direction perpendicular to the tool axis, illustrating how the work piece is cut by the first, second, and third protruding tool edges of the machining tool in FIGS. 2A and 2B.

In the machining tool 90, the first protruding tool edge 91A is formed for roughing, the second protruding tool edge 91B is formed for semi finishing, and the third protruding tool edge 91C is formed for finishing. That is, teeth with a predetermined shape can be created on the work piece W by a single operation of feeding the machining tool 90 in the direction of the work piece axis Rw of the work piece W. In the machining tool 90, as depicted in FIG. 4A, FIG. 4B, and FIG. 4C, the first protruding tool edge 91A for roughing and the second protruding tool edge 91B for semi finishing are formed to have the same cutting sectional area Ea per edge. The third protruding tool edge 91C for finishing is formed to have a cutting sectional area Eb per edge that is smaller than the cutting sectional area Ea.

As depicted in FIG. 4A, FIG. 4B, FIG. 4C, and FIG. 5, the first protruding tool edge 91A cuts the work piece W by a predetermined depth of cut t1 to form an area between tip surfaces of adjacent teeth of the gear formed on the work piece W. The second protruding tool edge 91B further cuts the part of the work piece W cut by the first edge face 91a, by a predetermined depth of cut t2 ($=(d2-d1)/2>t1$). The third protruding tool edge 91C further cuts the part of the work piece W cut by the second edge face 91b, by a predetermined depth of cut t3 ($=(d3-d2)/2<t1<t2$). The depth of cut t3 by the third protruding tool edge 91C may be the minimum depth of cut needed for finishing. Consequently, the work piece W is machined to have a root surface of adjacent teeth on the work piece W. Machining of the work piece W by the cutting with the first, second, and third protruding tool edges 91A, 91B, 91C simultaneously forms facing tooth flanks of the adjacent teeth of the gear.

As described above, when the machining tool 90 is driven straight ahead only once in the direction of the work piece axis Rw with respect to the work piece W, the first, second, and third protruding tool edges 91A, 91B 91C sequentially cut the work piece W to create teeth on the work piece W. Therefore, a large amount of cutting can be achieved without the need to feed the machining tool in the direction of the work piece axis a plurality of times as in the case of conventional machining tools. This enables a reduction in machining time and restrains the tool from being worn off to increase the tool life.

The first edge face 91a of the first protruding tool edge 91A is formed to have the largest circumferential width w1. This increases the rigidity of the first protruding tool edge 91A and suppresses excessive wear of the first protruding tool edge 91A during roughing. Cutting resistance during the cutting with the third protruding tool edge 91C is smaller than that during the cutting with the first or second protruding tool edge 91A, 91B. This improves machining accuracy of a machined surface and suppresses excessive wear of the third protruding tool edge 91C during finishing even though the third protruding tool edge 91C is formed to have the smallest circumferential width w3. The machining tool 90 is cylindrically shaped and can thus be easily produced compared to conventional conical machining tools, which result in cost reduction.

Now, basic operations performed when a tooth is formed on an inner peripheral surface of the work piece W using the above-described machining tool 90 will be described with reference to FIG. 6, FIG. 7A, and FIG. 7B. In the present embodiment, the work piece W is machined to form a tooth on an inner peripheral surface of the work piece W by way of example. Operations substantially similar to the operations in the present embodiment are performed to form a tooth on an outer peripheral surface of the work piece W. Although the first, second, and third protruding tool edges 91A, 91B, 91C are provided on an outer periphery of the machining tool 90 as depicted in FIG. 6, the first, second, and third protruding tool edges 91A, 91B, 91C are omitted from the drawings for simplification in FIG. 7A and FIG. 7B.

Figure 6:
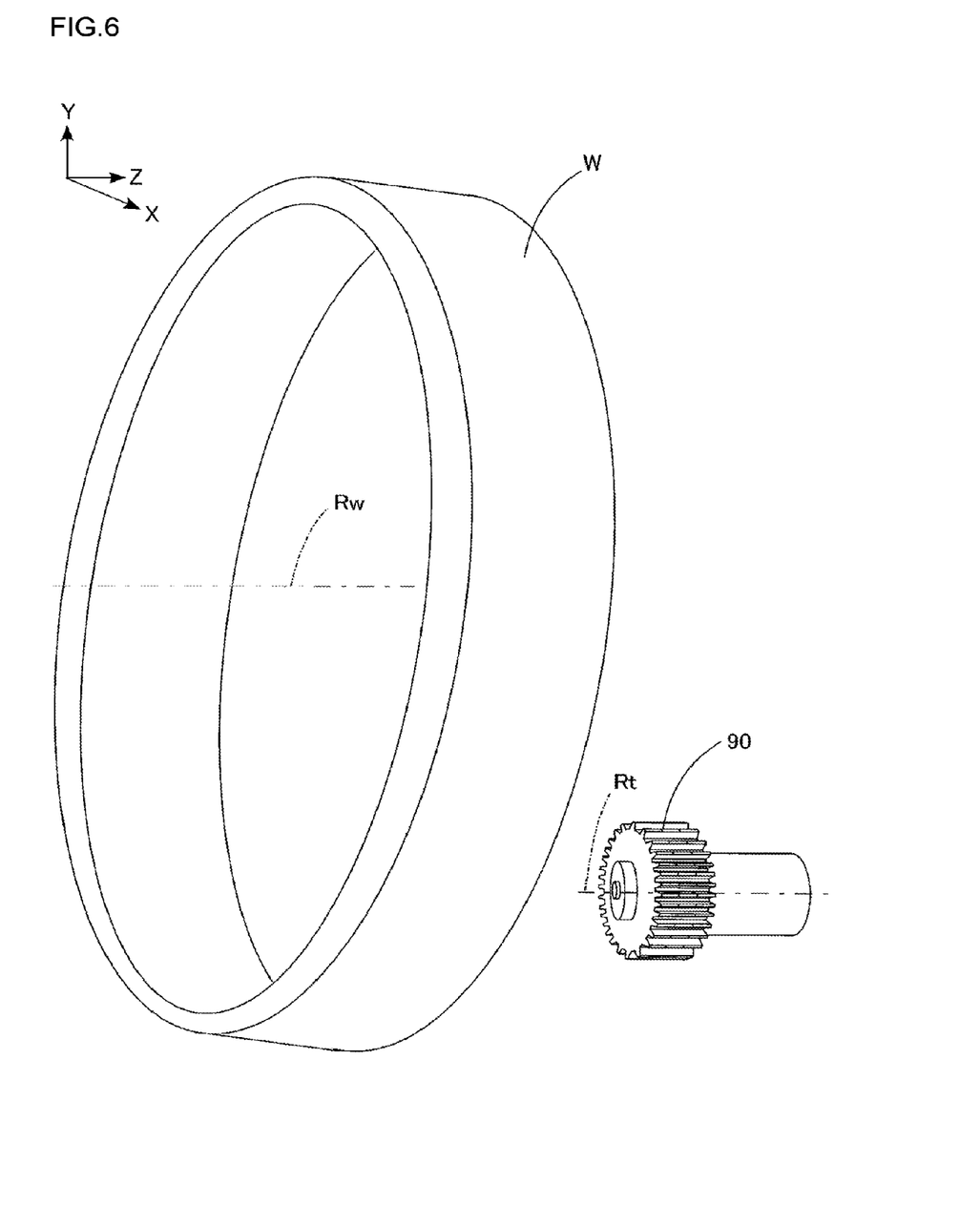
FIG. 6 is a perspective view illustrating how the machining tool in FIGS. 2A and 2B and the work piece are arranged when a tooth is formed on the work piece using the machining tool.
Figure 7A:
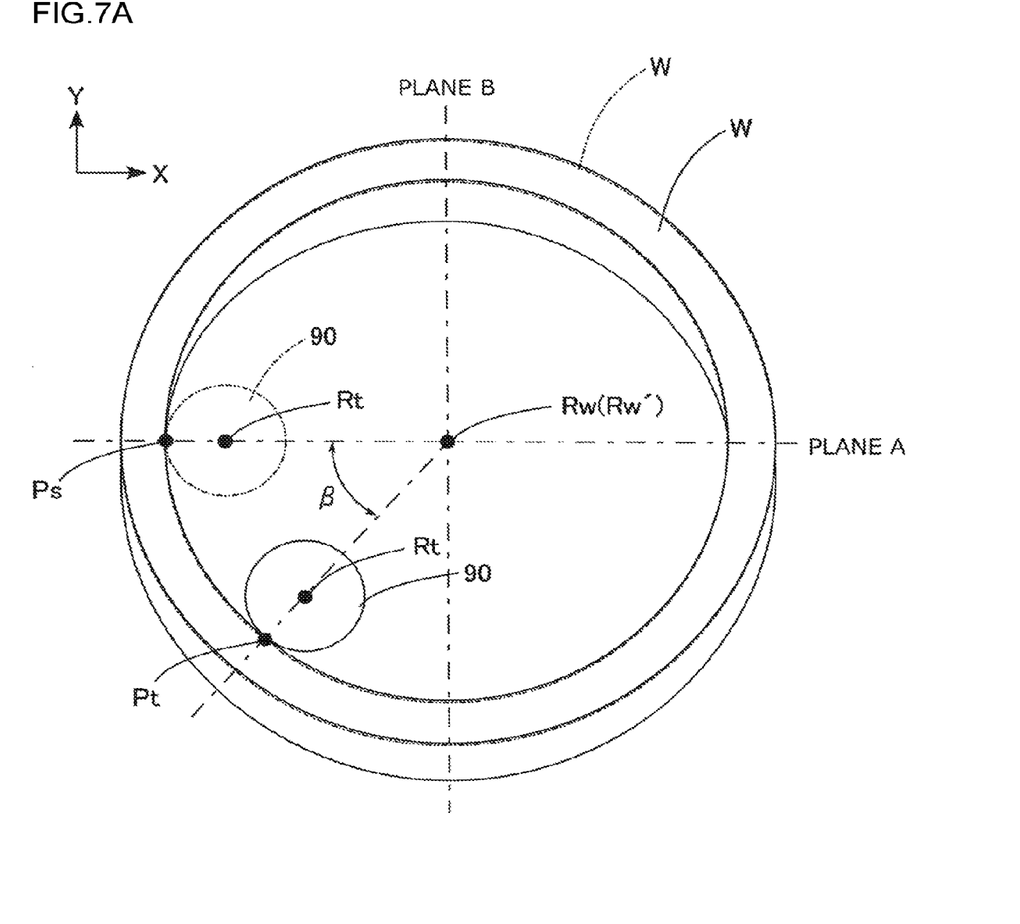
FIG. 7A is a diagram of the machining tool and the work piece in FIG. 6 as viewed in the direction of the tool axis.
Figure 7B:
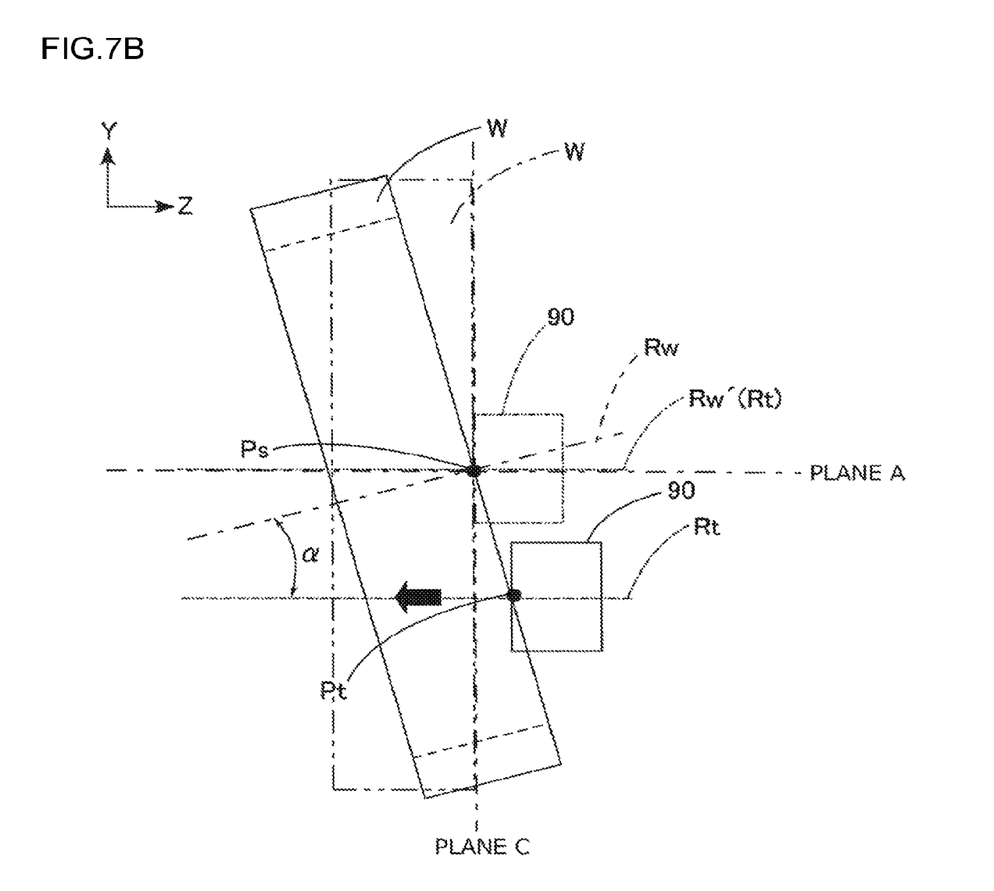
FIG. 7B is a diagram of the machining tool and the work piece in FIG. 6 as viewed in the horizontal direction that is perpendicular to the tool axis.

In the gear machining, the work piece W and the machining tool 90 are set in a skew state as depicted in FIG. 6, FIG. 7A and FIG. 7B. That is, as depicted in FIG. 7A, the tool axis Rt of the machining tool 90 is rotated through a predetermined angle around the work piece axis Rw. As depicted in FIG. 7B, the work piece axis Rw of the work piece W is inclined at a predetermined angle to the tool axis Rt of the machining tool 90. The work piece axis Rw of the work piece W and the tool axis Rt of the machining tool 90 are in a parallel state. The direction of the tool axis Rt of the machining tool 90 is referred to as the Z axis direction. The horizontal direction that is perpendicular to the tool axis Rt of the machining tool 90 is referred to as the X axis direction. The vertical direction that is perpendicular to the tool axis Rt of the machining tool 90 is referred to as the Y axis direction. In other words, FIG. 7A corresponds to FIG. 6 as viewed in the Z axis direction, and FIG. 7B corresponds to FIG. 6 as viewed in the X axis direction.

As depicted by long dashed double-short dashed lines in FIG. 7A and FIG. 7B, the work piece axis Rw of the work piece W is translated in the Z axis direction to obtain a work piece axis Rw', and a virtual machining point Ps for the work piece W is defined to be a machining point for machining with the work piece axis Rw' of the work piece W and the tool axis Rt of the machining tool 90 arranged parallel to each other in the X axis direction. A plane A is defined to be a plane that includes the work piece axis Rw' of the work piece W (the tool axis Rt of the machining tool 90) and the virtual machining point Ps for the work piece W. In other words, the plane A is a plane parallel to an X-Z plane. A plane B is defined to be a plane that crosses the plane A at right angles and includes the work piece axis Rw' of the work piece W. In other words, the plane B is a plane parallel to a Y-Z plane. A plane C is defined to be a plane that crosses the plane A and the plane B at right angles and includes the virtual machining point Ps for the work piece W. In other words, the plane C is a plane parallel to an X-Y plane.

In this case, when the work piece W and the machining tool 90 are projected on the plane C (the plane parallel to the X-Y plane) in a normal direction of the plane C (Z axis direction), the tool axis Rt of the machining tool 90 positioned at the virtual machining point Ps is rotated through a first angle β around the work piece axis Rw of the work piece W, as depicted in FIG. 7A. The first angle β is an offset angle that allows a rake angle and a clearance angle for machining to be formed in the first, second, and third protruding tool edges 91A, 91B, 91C of the machining tool 90. Providing the clearance angle for machining prevents the entirety of each of the first, second, and third protruding tool edges 91A, 91B, 91C except for the machining point Pt from coming into contact with the work piece W. In other words, the machining tool 90 even with the above-described simple shape can be reliably provided with the clearance angle for machining.

Moreover, when the work piece W and the machining tool 90 are projected on the plane B (the plane parallel to the Y-Z plane) in a normal direction of the plane B (X axis direction), the work piece axis Rw of the work piece W and the tool axis Rt of the machining tool 90 are tilted so as to form a second angle α between the work piece axis Rw and the tool axis Rt, as depicted in FIG. 7B. The second angle α is a crossing angle equal to the sum of a helix angle of the machining tool 90 having the first, second, and third protruding tool edges 91A, 91B, 91C with respect to the tool axis Rt and a helix angle of the tooth formed on the work piece W. In the present example, the helix angle of the machining tool 90 is 0°, and thus, the second angle α is the same as the helix angle of the tooth formed on the work piece W. When the work piece W and the machining tool 90 are projected on the plane A in a normal direction of the plane A, the central axis Rw of the work piece W and the central axis Rt of the machining tool 90 are set parallel to each other.

Subsequently, the work piece W is rotated around the work piece axis Rw, and the machining tool 90 is rotated around the tool axis Rt. At this time, rotation of the work piece W and rotation of the machining tool 90 are synchronized so as to have the same peripheral velocity at the machining point Pt. However, the work piece axis Rw of the work piece W and the tool axis Rt of the machining tool 90 are skewed from each other as described above, and therefore, have different tangent vector directions at the machining point Pt and thus have relative velocities, even with the same peripheral velocity. Consequently, the work piece W can be machined using the machining tool 90. Moreover, with the machining tool 90 and the work piece W synchronously rotated, the machining tool 90 is driven straight ahead in the direction of the tool axis Rt with respect to the work piece W (this is depicted by a thick arrow in FIG. 7B). In the present embodiment, with the machining tool 90 fixed in the Z axis direction, the work piece W is moved in the Z axis direction. As a result, a tooth is formed on the work piece W.

In the above-described embodiment, in the machining tool 90, the first, second, and third protruding tool edges 91A, 91B, 91C, which form three steps, are integrated together. However, the first, second, and third protruding tool edges 91A, 91B, 91C, which form three steps, may be separately formed and fastened together using bolts or the like. The first, second, and third protruding tool edges 91A, 91B, and 91C formed to have the same edge thickness d on the pitch circle P. However, the edge thickness d on the pitch circle P may increase in an order of the first, second, and third protruding tool edges 91A, 91B, 91C. Although the machining tool 90 is configured to include the first, second, and third protruding tool edges 91A, 91B, and 91C, which form three steps, the machining tool 90 may include protruding tool edges forming two steps or four or more steps.

Instead of being constant in the extending direction of each protruding tool edge 91, the circumferential width w1, w2, w3 of the edge face 91a, 91b, 91c may be such that only an end of the edge face 91a, 91b, 91c closer to the tool leading end is set to have the circumferential width w1, w2, w3 and that the circumferential width w1, w2, w3 decreases gradually or in a stepwise manner over the length k. The radial outer faces (edge faces) 91a, 91b, and 91c of the first, second, third protruding tool edges 91A, 91B, 91C may be flat faces or curved faces.

The gear machining apparatus 1, which is a five-axis machining center, enables the work piece W to turn around the A axis. Alternatively, the five-axis machining center may be a vertical machining center that enables the machining tool 90 to turn around the A axis. As described above, the invention is applied to the machining center. However, the invention is equally applicable to machines dedicated to gear machining.

The gear machining apparatus 1 in the present embodiment includes the machining tool 90 having the plurality of protruding tool edges 91A, 91B, 91C on the outer periphery of the machining tool 90, and the driving apparatuses 20, 30, 40, 50, 60, 70 that allow a tooth to be formed on the work piece W by rotating the machining tool 90 around the central axis Rt thereof, rotating the work piece W around the central axis Rw thereof, and moving the machining tool 90 relative to the work piece W. The radial outer faces of the protruding tool edges forms multiple steps that are parallel to the central axis Rt of the machining tool 90 such that the diameter of the machining tool 90 increases in a stepwise manner from the tool leading end toward the leading end base end of the machining tool 90. The driving apparatuses 20, 30, 40, 50, 60, 70 set the tool axis Rt of the machining tool 90 and the work piece axis Rw of the work piece W in a skew state, and drive the machining tool 90 straight ahead in the direction of the tool axis Rt of the machining tool 90 toward the work piece W while synchronizing rotation of the work piece W with rotation of the machining tool 90 so as to allow the protruding tool edges 91A, 91B, 91C to form a tooth on the work piece W.

The machining tool 90 is driven straight ahead in the direction of the central axis Rt of the machining tool 90 with respect to the work piece W so as to allow the protruding tool edges 91A, 91B, 91C, which form multiple steps, to sequentially cut the work piece W. Thus, the work piece W can be cut by a large amount by a single operation of feeding the machining tool 90 in the direction of the tool axis Rt. Therefore, the work piece W can be cut by a large amount without the need to feed the machining tool in the direction of the tool axis Rt a plurality of times as in the case of conventional machining tools. This enables a reduction in machining time and restrains the tool from being worn off to increase the tool life.

In the machining tool 90, the radial outer faces of the protruding tool edges 91A, 91B, 91C are each formed to have, at the corresponding step, a constant circumferential width in the extending direction of the protruding tool edge 91A, 91B, 91C such that the circumferential widths decrease in a stepwise manner from the tool leading end toward the tool base end of the machining tool 90. The first protruding tool edge 91A at the tool leading end side is formed to have the largest circumferential width. This increases the rigidity of the first protruding tool edge 91A and suppresses excessive wear of the first protruding tool edge 91A.

In the machining tool 90, the protruding tool edges 91A, 91B, 91C are integrally formed and can thus be accurately set in phase with one another.

In the machining tool 90, the protruding tool edges 91A, 91B, 91C at the respective steps are formed to have the same edge thickness, the same module, and the same number of edges on the pitch circle. Consequently, the contour shape of the edge end face of the protruding tool edge 91A at the tool leading end side is included in the contour shape of the edge end face of the protruding tool edge 91B next to the protruding tool edge 91A. The contour shape of the edge end face of the protruding tool edge 91B is included in the contour shape of the edge end face of the protruding tool edge 91C next to the protruding tool edge 91B. Therefore, a previously machined cut part is prevented from being subsequently machined, enabling a reduction in burdens on the protruding tool edges 91B, 91C to increase the tool life.

In the machining tool 90, the protruding tool edge 91A at the tool leading end side is formed for roughing, and the protruding tool edge 91C at the tool base end side is formed for finishing. The protruding tool edge 91A at the tool leading end side is formed to have the largest circumferential width. This increases the rigidity of the protruding tool edge 91A and suppresses excessive wear of the protruding tool edge 91A during roughing.

The machining tool 90 is formed such that all the protruding tool edges other than the protruding tool edge 91C formed for finishing, that is, the protruding tool edges 91A, 91B, have the same cutting sectional area per edge. Cutting resistance of the protruding tool edge 91C is smaller than that of the other protruding tool edges 91A, 91B. This improves machining accuracy of the machined surface and suppresses excessive wear of the protruding tool edge 91C during finishing even though the protruding tool edge 91C is formed to have the smallest circumferential width.

The following definitions are applied when the driving apparatuses 20, 30, 40, 50, 60, 70 set the tool axis Rt of the machining tool 90 and the work piece axis Rw of the work piece W in a skew state. The virtual machining point Ps for the work piece W is defined to be a machining point for machining with the central axis Rw of the work piece W and the central axis Rt of the machining tool 90 arranged parallel to each other. The plane A is defined to be a plane that includes the central axis Rw of the work piece W and the virtual machining point Ps for the work piece W. The plane B is defined to be a plane crosses the plane A at right angles and includes the central axis Rw of the work piece W. The plane C is defined to be a plane that crosses the plane A and the plane B at right angles and includes the virtual machining point Ps for the work piece W.

When the work piece W and the machining tool 90 are projected on a first plane parallel to the plane C in a normal direction of the first plane, the central axis Rt of the machining tool 90 positioned at the virtual machining point Ps is rotated through a predetermined angle around the central axis Rw of the work piece W. When the work piece W and the machining tool 90 are projected on a second plane parallel to the plane B in a normal direction of the second plane, the central axis Rw of the work piece W and the central axis Rt of the machining tool 90 are tilted so as to form a predetermined angle between the central axis Rw and the central axis Rt. When the work piece W and the machining tool 90 are projected on a third plane parallel to the plane A in a normal direction of the third plane, the central axis Rw of the work piece W and the central axis Rt of the machining tool 90 are set parallel to each other. Consequently, the machining tool 90 in the present embodiment allows accurate gear machining.

What is claimed is:

1. A gear machining apparatus comprising:
   a machining tool including a tool edge having a plurality of protruding tool edges on an outer periphery of the machining tool; and
   a driving apparatus that forms a tooth on a work piece by rotating the machining tool around a central axis thereof, rotating the work piece around a central axis thereof, and moving the machining tool relative to the work piece; wherein
   the driving apparatus sets the central axis of the machining tool and the central axis of the work piece in a skew state, and drives the machining tool straight ahead in a direction of the central axis of the machining tool toward the work piece while synchronizing rotation of the work piece with rotation of the machining tool so as to allow the protruding tool edges to form the tooth on the work piece, and
   radial outer faces of the protruding tool edges form multiple steps that are parallel to the central axis of the machining tool such that a diameter of the machining tool increases in a stepwise manner from a tool leading end toward a tool base end of the machining tool, wherein
   the machining tool is formed such that circumferential widths of the radial outer faces of the protruding tool edges decrease in a stepwise manner from the tool leading end toward the tool base end of the machining tool, the radial outer faces forming the multiple steps such that the diameter of the machining tool increases in a stepwise manner.

2. The gear machining apparatus according to claim 1, wherein
   in the machining tool, the protruding tool edges forming the multiple steps are integrally formed.

3. The gear machining apparatus according to claim 1, wherein
   in the machining tool, the protruding tool edges forming the multiple steps have the same edge thickness, the same module, and the same number of edges on a pitch circle.

4. The gear machining apparatus according to claim 1, wherein
   in the machining tool, a protruding tool edge of the plurality of protruding tool edges that is nearest the tool leading end is formed for roughing, and a protruding tool edge of the plurality of protruding tool edges that is nearest the tool base end is formed for finishing.

5. The gear machining apparatus according to claim 4, wherein
   in the machining tool, all the protruding tool edges other than the protruding tool edge nearest the tool base end have a same cutting sectional area per edge.

6. The gear machining apparatus according to claim 1, wherein
   when the driving apparatus sets the central axis of the machining tool and the central axis of the work piece in the skew state, a virtual machining point for the work piece is defined to be a machining point for machining with the central axis of the work piece and the central axis of the machining tool arranged parallel to each other, a plane A is defined to be a plane that includes the central axis of the work piece and the virtual machining point for the work piece, a plane B is defined to be a plane that crosses the plane A at right angles and includes the central axis of the work piece, and a plane C is defined to be a plane that crosses the plane A and the plane B at right angles and includes the virtual machining point for the work piece,
   when the work piece and the machining tool are projected on the plane C in a normal direction of the plane C, the central axis of the machining tool positioned at the virtual machining point is rotated through a predetermined angle around the central axis of the work piece, when the work piece and the machining tool are projected on the plane B in a normal direction of the plane B, the central axis of the work piece and the central axis of the machining tool are tilted so as to form a predetermined angle between the central axis of the work piece and the central axis of the machining tool, and when the work piece and the machining tool are projected on the plane A in a normal direction of the plane A, the central axis of the work piece and the central axis of the machining tool are set parallel to each other.

\* \* \* \* \*